Sept. 10, 1957  P. J. McGAULEY  2,805,938
SEPARATION OF METAL SULFIDES
Filed Jan. 7, 1955  3 Sheets-Sheet 1

INVENTOR.
PATRICK JOSEPH McGAULEY,

Sept. 10, 1957 P. J. McGAULEY 2,805,938
SEPARATION OF METAL SULFIDES
Filed Jan. 7, 1955 3 Sheets-Sheet 2

INVENTOR.
PATRICK JOSEPH McGAULEY.

Sept. 10, 1957 P. J. McGAULEY 2,805,938
SEPARATION OF METAL SULFIDES
Filed Jan. 7, 1955 3 Sheets-Sheet 3

INVENTOR.
PATRICK JOSEPH McGAULEY.

United States Patent Office 2,805,938
Patented Sept. 10, 1957

2,805,938

SEPARATION OF METAL SULFIDES

Patrick J. McGauley, Port Washington, N. Y.

Application January 7, 1955, Serial No. 480,389

11 Claims. (Cl. 75—101)

This invention relates to a hydrometallurgical process for separating values in iron and in sulfur from materials containing the same. Still more specifically, the invention relates to a process for separating such materials from the various constituents of sulfide ores and/or concentrates, and industrial by-products and intermediates. It also contemplates a concurrent separation and recovery of non-ferrous metals such as copper, lead, zinc, cobalt and nickel.

Values in iron and other metals discussed herein frequently occur in nature as sulfide minerals. Since as minerals they seldom occur alone or in desirably high concentrations, ores thereof are often concentrated by known treatments. Although concentrates are a preferred source materials, in some cases ores may be treated directly. Metal values also occur in said by-products or intermediates or as liquors from various chemical or metallurgical processes.

Previously-used treatments of such source materials to recover values therefrom have varied widely with the nature of the material. Such treatments range from simple steps to complex combinations. While many achieve a measure of success, an improvement is still desirable in methods for the simultaneous recovery of iron and elemental sulfur. Particularly is this so when values in iron and several non-ferrous metals must be economically recovered separately from each other.

Accordingly, it is a primary object of the present invention, to provide such a process of greater applicability and flexibility. It is a still further object to provide a process adapted to separate values in iron and sulfur from such widely varying iron and sulfur-bearing starting materials as pickle liquor, mattes, speisses, ores and ore concentrates. When appreciable values in non-ferrous metals are found in the starting material, such a process desirably should be capable of separating them from iron, diluent metals and non-metals and, if possible, from each other.

To this end, the process of the present invention not only permits directly treating an available feed solution, such as pickle liquor, containing dissolved salts of the metal of interest, but also contemplates a partially cyclic process including leaching to obtain the liquor. In some cases, the overall process may even start by preparing material to be leached.

Accordingly, the overall process may be briefly described in the following way. If leaching pretreatment is used, it will ordinarily comprise subjecting an iron-containing sulfide mineral to a known roasting operation, usually in the presence of non-oxidizing gases. Calcine is then leached with an aqueous acidic liquor, ordinarily sulfuric. Feed liquor, from calcine leaching or elsewhere, is separated from accompanying solids if necessary or so desired and then treated with oxygen at super-atmospheric pressure and at elevated temperature in the presence of copper sulfide. Resultant oxidized materials are separated into a clarified liquor and a solids-bearing slurry which are then separately treated.

Said clarified liquor is treated with a reactive sulfide to reform a sufficient amount of sulfide which is collected and recycled to the oxidation step. Finally, resultant solution is treated to recover acid for reuse in leaching and/or as product acid for other purposes. If the liquor contains more copper than is needed for recycle to the oxidation step and/or when other dissolved non-ferrous metal values are present, such excess copper and/or other metals are separated and recovered as products.

Said solids-bearing slurry is sent to an operation in which elemental sulfur and iron, usually as sintered iron oxides, are recovered as products. While iron and sulfur recovery are essential features, in the overall process, each may be done in known ways. It is, therefore, the incorporation of such steps into the overall process, and not the exact steps in each, which is important to the present invention.

In this brief description, two separate steps designated as "leaching" and as "oxidation" have been mentioned. In both, some metal values are dissolved. However, the "leaching" step is ordinarily done in the absence of pressure other than that necessarily involved in collecting the off-gases. Ordinarily, oxidizing gases are not used and no oxidation of sulfur occurs. The term is used herein to distinguish that operation from the "oxidation." The latter is ordinarily characterized by being done in the presence of oxygen and at temperatures and pressures appreciably above atmospheric conditions. Since the primary functions of the two operations are different, they are ordinarily separately done in separate vessels. However, as will be more fully discussed below, in some cases they may be done concurrently in one vessel.

A more detailed description of the several operations and their functions is set out below, after which several specific embodiments are discussed in conjunction with the accompanying drawings which show several of the possible variations in the overall flowscheme and in which.

Figure 1:
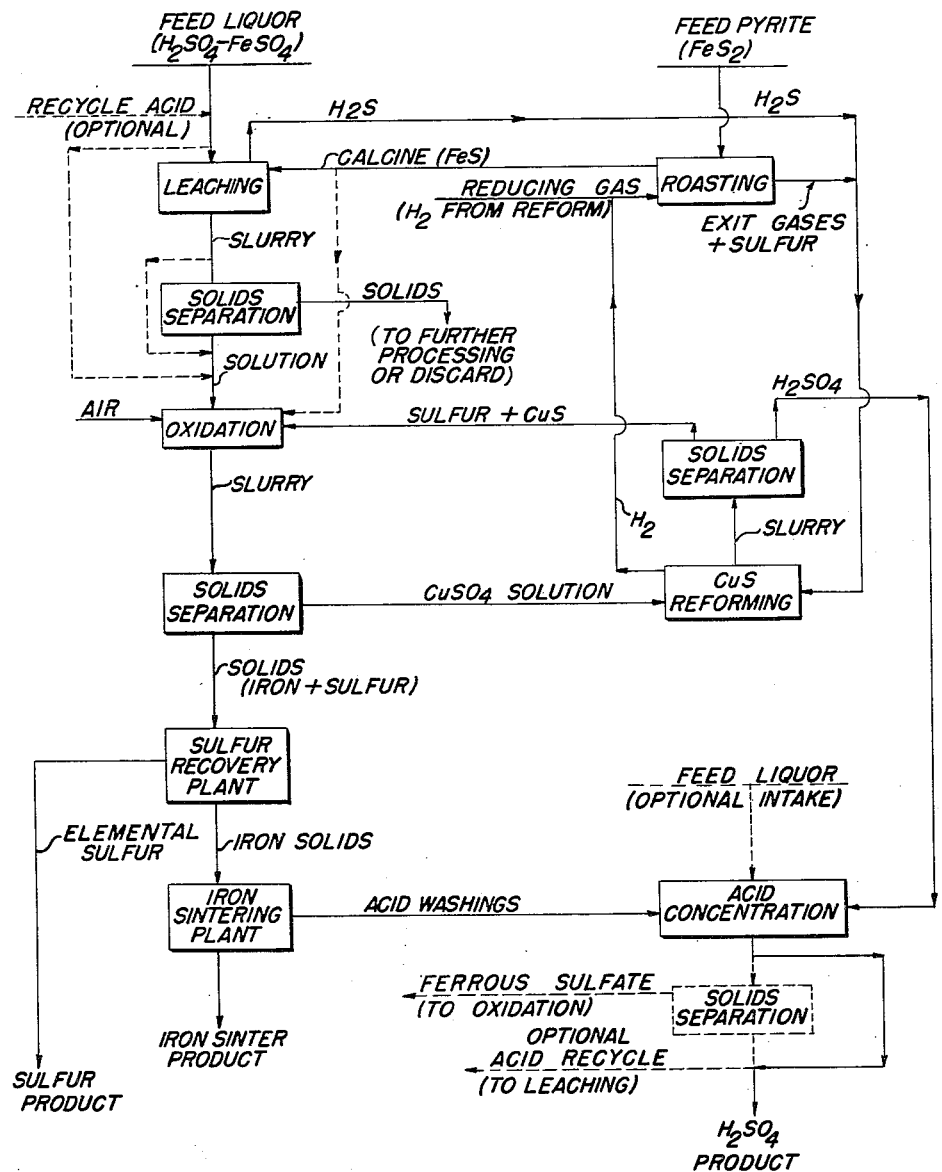
Fig. 1 is a flowscheme for an application of the process in the rejuvenation of a spent pickle liquor.

As was noted above, the process of the present invention involves a sequence of steps which are combined into an overall process and if necessary or desirable, the sequence may start with a roasting operation. If so, the solids to be roasted ordinarily comprise an iron-containing sulfide mineral. For purposes of this discussion it is assumed that iron pyrite can be represented as $FeS_2$ and that pyrrhotitic iron minerals can be represented as $Fe_xS_y$, where $x$ is more than one and $y$ is greater than $x$. Since the basic object here is to recover iron and elemental sulfur, such solids may and often will be an otherwise substantially barren ore of pyritic iron minerals, possibly also containing some values in precious metals. On the other hand, the ore may contain, along with iron and sulfur, such non-ferrous metals as copper, lead, zinc, cobalt, nickel, cadmium and usually some precious metals. In such ores, the total and soluble metal to sulfide-sulfur mol ratio is usually greater than in FeS.

In any case, when solids are fed, usually an ore or a concentrate, they are roasted. This is usually done within a temperature range of from about 200° to about 1000° C., ordinarily at about 500°–800° C., whereby sulfur is freed and volatilized. Since a final object is to produce elemental sulfur, burning of the sulfur is undesirable and a non-oxidizing or reducing atmosphere is maintained in the roaster.

For this purpose, reducing gases may be obtained from any available source. As will be brought out, the roaster atmosphere may comprise hydrogen from any suitable source as by the reaction of methane plus water as in a gas reformer. However, since an object of the overall process is to recover sulfur in elemental form and since hydrogen roasting conditions, converts sulfur vapor to hydrogen sulfide, the use of excessive amounts of hydrogen is neither necessary nor desirable. Some stack or waste gas of such composition as to provide heat plus a non-oxidizing atmosphere in the roaster may be used.

During roasting, the ratio of sulfur to such associated metals for example as copper, nickel or cobalt is usually reduced to some extent. Usually however, the ratio does not change as markedly as does the ratio of sulfur to associated iron. The latter is reduced sufficiently to approximate more nearly that found in FeS. However, sulfur reduction is not the sole function. As is well known, many naturally-occurring mineral sulfides, particularly pyrite, are not noticeably reactive, as for example to dissolution in mineral acids. Sulfides in the calcine, particularly the iron sulfides, are much more reactive than in their original condition. Ideally they should be brought to a sulfur content in which at ambient conditions they undergo a reaction of the types:

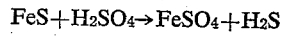

$FeS + H_2SO_4 \rightarrow FeSO_4 + H_2S$ or

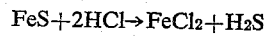

$FeS + 2HCl \rightarrow FeCl_2 + H_2S$

The overall results of the roasting step, then, are both to increase the reactivity of residual sulfides of both ferrous and non-ferrous metals, to produce a more nearly unitary sulfur-iron ratio, and to release excess sulfur. The exact unit ratio of iron to sulfur in pure FeS will probably never be attained for iron sulfides in the calcine. Iron-sulfur ratios as in such pyrrhotitic materials as for example $Fe_7S_8$ to $Fe_{11}S_{12}$ are more to be expected. However, they will be much less than for $FeS_2$ and for simplicity of discussion the iron sulfide in the calcine will be referred to here as FeS.

Next in the operational sequence, calcine from the roasting step is leached, i. e., treated with an aqueous acidic leaching liquor, sulfuric acid solution being the leaching liquor of choice. Such liquor either may be some industrial by-product, such as spent pickle liquor, or an acidic solution whose acid concentration has been deliberately adjusted. It may, and often will be in whole, or in part, an acidic solution containing copper sulfate recycled from subsequent steps. The source of the acid is not important, nor usually is its strength. The dissolved content, particularly of acid, is important. Preferably, the latter should be less than that stoichiometrically equivalent to the iron in the calcine.

This leaching step, which may be done in any suitable vessel or tower, produces hydrogen sulfide as a gaseous product. Such hydrogen sulfide is collected and used in the copper sulfide reforming step. If hydrogen sulfide is produced in the reduction roasting step the two may be combined and utilized therefor as more fully described below. Leaching temperature need not be high. It should be above about 25° C. but will not ordinarily exceed about 95° C. It will be done at about atmospheric pressure in most cases. Pressure more than that caused by closing the circuit to collect the off-gas is not needed. Of course, if so desired, higher temperatures may be used. In that case enough pressure must be used to insure against boiling the liquor. This is not usually a preferred practice because it requires pressure apparatus.

Since FeS is somewhat more soluble in strongly acidic solution than most non-ferrous metal sulfides, during leaching it will replace any dissolved copper sulfate. If such metals as zinc, cadmium, nickel, cobalt and the like, whose sulfides have a solubility more nearly that of FeS, are present, these will ordinarily either dissolve or remain in solution. Precious metals remain in the residue. This helps to achieve one desired result in the leaching step, i. e., that substantially all available iron should go into solution while substantially all of any copper and precious metal in the feed should remain in the solid residue.

In the overall process of the present invention then, the solids residue after leaching will vary in content. If the calcine is from barren pyrite, such residue will comprise essentially acid-insoluble gangue wich may be discarded. However, if such materials are present in the feed, substantially all the values in copper and any precious metals such as gold or the platinum metals, will remain with any acid-insoluble gangue. In such cases, the solids obviously will be further processed as shown below. Solution from leaching ordinarily contains substantially all the iron and if present the zinc, cadmium, nickel and cobalt. An exception to this general practice will be discussed below.

Such residue and solution may be separated readily by such operations as thickening and decanting or by filtration or their equivalents. In this discussion it is to be understood that solids separation steps may be done by any of these known methods.

Solution after leaching is then subjected to the operational sequence which constitutes the characteristic treatment of the present process. It is subjected to treatment with oxygen and copper sulfide at superatmospheric temperatures and pressures in an agitated pressure vessel. Possibly the most important reaction taking place during oxidation may be represented as follows:

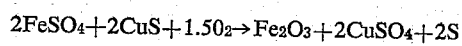

$2FeSO_4 + 2CuS + 1.5O_2 \rightarrow Fe_2O_3 + 2CuSO_4 + 2S$

A finite partial pressure of oxygen above the autogenous pressure should be maintained in the pressure vessel. It should be at least five p. s. i. g. More is desirable, since within reasonable limits the more oxygen available, the faster the reaction. However, the higher the total pressure, the heavier will be the equipment required. Therefore, while they may be used, actually more than about 200 p. s. i. g. oxygen partial overpressure is seldom economically warranted.

An excess of oxygen may also exert a deleterious effect in another way. As will be brought out, elemental sulfur may and usually will be present at this stage. An excess of oxygen at too high a temperature range will convert such elemental sulfur to sulfate ion. Since sulfate ion from sulfur is an undesirable product of the oxidation step, conditions favoring its formation should be minimized. One effective method is to control the maximum temperature. The latter should not exceed the melting point of sulfur by more than about ten degrees at the reaction conditions during oxidation. While the exact melting point may vary somewhat with circumstances, it usually is considered as at about 119° C. Therefore, temperatures of above about 100° C. but below about 130° C., can be used. In some cases provision for cooling may be necessary. If elemental sulfur present during oxidation does melt, it tends to agglomerate and to wet the metal sulfides and thereby reduce operating efficiency. In the present process, this is undesirable during oxidation and during this reaction the preferred practice is to use temperatures above about 100° C., but below about 119° C. However, particularly after oxidation is complete, it may be advisable to raise the temperature above the melting point of sulfur for a short period. If done at this time, the resulting slight agglomeration of sulfur may help later in separating iron oxide therefrom.

Solid and liquid components of the oxidation vessel discharge are separated, again as by thickening or its equivalent. The solids comprise elemental sulfur admixed with substantially all the iron, principally as ferric oxide or hydroxide but usually with a small amount of basic ferric sulfate. The mixture of iron compounds and elemental sulfur are recovered and/or separated as products. These steps can be done by known procedures, the exact details of which as noted above are not a part of this invention.

Solution separated from the iron-sulfur residue is substantially an acidic solution of copper sulfate which also contains sulfates of any non-ferrous metals whose sulfides are more soluble in acid. Hydrogen sulfide from some source, usually from the leaching and/or roasting step, is passed into this solution in amounts sufficient to precipitate the requisite amount dissolved copper as copper sulfide. This will be the amount of copper sulfide needed for the oxidation treatment in the next cycle. Alternatively to the use of hydrogen sulfide to precipitate copper sulfide, an iron sulfide can be used for the same purpose, especially if assisted by hydrogen as shown in my U. S. Patent No. 2,662,209. However, this will not be the usual procedure if acid is to be a product of the plant.

High pressure need not be used to effect this precipitation. Some pressure is needed to handle the hydrogen sulfide gas, and/or any hydrogen that may be present. This step ordinarily will be carried out at about 5-75 p. s. i. g. A good practice is to use from about 10-30 p. s. i. g., since pressure does not aid greatly in the precipitation of copper sulfide.

The reaction temperature is not particularly significant in the actual precipitation. It has been found, however, that using a temperature of about 80° C. in the precipitation step for some reason aids in the filtration of the copper sulfide from the acidic mother liquor. Temperatures higher than about 100° C. ordinarily are not desirable.

Copper sulfide precipitate is separated from the slurry and recycled to the oxidizing operation, usually after being repulped in water or in leach solution. Acid solution resulting from the copper sulfide filtration may be recycled in whole or in part as leaching liquor to the leaching step. Alternatively, it may be treated to recover all or part of the free acid content.

At the various points in the process where hydrogen sulfide is removed from liquids, it may sometimes be advisable to help strip the liquids of hydrogen sulfide by passing in steam. Any water vapor passing over with the off gases can be condensed out readily.

It should be noted that the characteristic closed cycle of copper used in the process of the present invention is present whether or not the feed contains copper. When using feed minerals, if copper is present, it is usually removed as insoluble copper sulfide immediately after the leaching step. All or part of it sometimes may be used as makeup copper sulfide for use in the oxidation step. Otherwise, such copper sulfide has no relation to that used in the closed cycle of copper and copper sulfide as used in conjunction with the oxidizing and related cyclic steps.

The above description generally outlines the novel overall process of the present invention. It may be characterized by using an acidic leaching concurrently with or followed by oxidation in the presence of copper sulfide, and by a substantially closed cycle of copper as it changes from copper sulfide to copper sulfate and back again. Where iron and/or non-ferrous metal sulfides are treated, roasting to reduce the ratio of sulfide-sulfur to metal will increase its reactivity with the leaching acid. With this combination of steps as a basis, the process of the present invention may be utilized in an extraordinarily wide variety of processes.

Fig. 1 shows the process of the present invention as adapted to treat a natural pyrite ore by an industrial by-product sulfuric acid-ferrous sulfate liquor, such as a spent pickle liquor, primarily to recover iron and sulfur from both and to regenerate the acid for reuse. Normal flows, as shown in solid lines, will be discussed first. A pyrite ore, in the illustrative case one assaying about Fe—46%; S—47.5% and Au about 0.24 oz. per ton, is roasted at about 650° C. in the presence of non-oxidizing stack gas to a calcine assaying about Fe—57% and S—35%. Calcine is then leached with the pickle liquor in the illustrative case one containing about 4.5% sulfuric acid and 16.2% ferrous sulfate. An excess of calcined pyrite is ordinarily used to insure production of ferrous sulfate in amount equivalent to the sulfuric acid content of the pickle liquor. The excess need not be large, some one to ten percent being adequate. More can be used.

Unreacted calcine and/or other insoluble solids are then separated. In the illustrative case they comprise the excess, the some 7-8% calcine and the gold. Solution from leaching, in the illustrative case containing about 18.8% ferrous sulfate, is then subjected to the oxidation step in the presence of copper sulfide. A slight deficiency of copper sulfide is desirable to prevent copper from passing to the iron plant. In the illustrative case, some 235 pounds of copper sulfide per ton of liquor is used.

The primary purpose of the leaching and solid separation steps prior to oxidation is to permit withdrawing from the circuit such insolubles as lead and the like, gangue and precious metals. If the solids have value, as in the illustrative case, they are further processed by known methods. If not, they are discarded. If the total amount of excess calcine and other solids is small, or if there are no values therein, either or both steps may be bypassed as shown in the dotted flow lines. In such cases the insoluble removal and/or discard is taken care of in the iron and sulfur recovery steps.

As one variable, oxidation may be done as a subsequent step in the same vessel as the leaching, if so desired. However, since pressure is necessary during oxidation but not in leaching, a separate vessel, as shown, is preferred. Slurry from the oxidation step is thickened or filtered in order to separate solution from the solids which contain elemental sulfur plus insoluble iron compounds. Resultant copper sulfate solution is treated with the hydrogen sulfide off-gas mixture from the leaching and/or washing steps, which converts dissolved copper sulfate to insoluble copper sulfide. The latter is filtered out, or otherwise collected, and recycled to the oxidation step.

It is desirable at this point to reconsider the possibilities of the roasting operation. As pointed out above, not only is it done under non-oxidizing conditions to remove sulfur from the solids, but if hydrogen is present in the roaster atmosphere, hydrogen-sulfide is found in the off-gas. The leaching step, when done separately as shown, also and of necessity results in hydrogen sulfide production when sulfuric acid is present in the leach liquor.

Actually, since elemental sulfur is the desired product form, intentional production of hydrogen sulfide in either step is not particularly desirable. Ordinarily then, if possible, it should not be done during roasting to an extent greater than necessary to produce any additional hydrogen sulfide not otherwise available and needed to regenerate copper sulfide from the solution after oxidation. Therefore, any excess hydrogen supplied to the roaster atmosphere above such a minimum is wasted and unless present in the available non-oxidizing gases is seldom supplied to the roaster purposely except when the leaching step is by-passed.

This also supplies an added reason for by-passing the low-pressure low temperature leaching step in whole or in part when the acid insoluble content of the calcine is low in amount and/or value. So long as copper sulfide is present in the oxidizing stage, any calcine added thereto is preferably as a slurry is recycled acid or in feed pickle liquor whichever is used, will undergo consecutively and regeneratively in one vessel the same reactions which occur when the steps are done in separate vessels.

When hydrogen is present in the roaster atmosphere to a lesser amount than the sulfur driven off, sulfur vapor will be present as such in the exit gases. This is the preferable operation. As shown in Fig. 1, it will pass into the copper sulfide reforming step and to the oxidation stage with the latter and thence to the sulfur recovery plant along with any sulfur formed in the oxidation step.

The elemental sulfur and iron-bearing residue is sent to a sulfur recovery plant wherein sulfur is separated from the iron compounds in any desired manner, as by froth flotation. It is removed as product elemental sulfur. In an iron recovery plant, the residual iron solids are washed, dried and sintered to form marketable iron sinter. Actual operating details of the iron and sulfur recovery plants may involve only known steps and are not a feature of this invention. In the illustrative case feeding about one ton of calcine for about 22.2 tons of pickle liquor produces about 2300 pounds of elemental sulfur and about 2350 pounds of iron as sintered iron oxides.

Any washings from the sulfur and iron recovery plants which contain acid are usually sent to an acid concentrating plant, together with the acid solution remaining after copper sulfide separation. Some of either or both may be recycled to other use in the circuit if so desired. In the acid concentrating plant the liquor is concentrated, as by evaporation, to the desired strength, filtered if necessary and finally product acid for recycling or other industrial use is obtained. In the latter case, it may be desirable to concentrate the acid to more than the normal content for reuse as pickle liquor. If such concentration is carried to a sufficiently high acid content, ferrous sulfate may crystallize during concentration. If so, it is removed, as by a filter, and is usually recycled to oxidation as shown. Since the acid is usually concentrated only to about 15%, in the illustrative case 14%, such crystallization is not normally expected. Moreover, at this stage there should be very little iron in solution since it should be precipitated substantially completely in the oxidation step. For these reasons, the solids separation step after acid concentration is shown in dotted lines as optional. In the illustrative case, about 7.0–7.2 tons of clarified acid is obtained per ton of calcine treated.

Two optional variations in the acid concentration steps may be used. It may be, and often is, desirable to return some product acid to leaching. In Figure 1, this is shown in dotted lines. It also may be found that the acid liquor feed is very dilute. If so, it will be desirable to feed part, or even all, of the acid feed liquor to the acid concentration step. This too is shown in dotted lines. In that case, acid for leaching is passed from the filter to leaching as just discussed.

In Fig. 1, iron and sulfur are obtained primarily from the otherwise substantially barren pyrite, the present process being excellent for the purpose of obtaining elemental sulfur and an iron oxide concentrate from this mineral. Gold if present is recovered. As used in Figure 1, iron and sulfur are also recovered from the acid-iron sulfate liquor in revivifying the acid for reuse. This latter feature need not always be present. The elemental sulfur and iron products have several times the market value of the pyrite. Therefore, if no such waste acid source is available, acid may be used directly. In that case much or all of the acid liquor obtained in the reforming of the copper sulfide is returned to leaching directly and the acid concentration plant need not be utilized except perhaps to aid in maintaining a water balance.

Moreover, the process discussed in conjunction with Fig. 1 utilized only barren pyrite. This does not begin to exhaust the possibilities of the process in separating other metals than iron from ores of sulfur-containing minerals. It is desirable to extend the application of the process for such purposes. Perhaps the simplest such application may be illustrated in treating a chalcopyrite.

For purposes of illustration, the latter mineral is considered to be $CuFeS_2$ and the usual feed to be an ore concentrate which will contain additional pyritic and/or pyrrhotitic iron sulfides. One flowscheme, using sulfuric acid in a copper recovery procedure on such a feed solids mixture is shown in Fig. 2.

Figure 2:
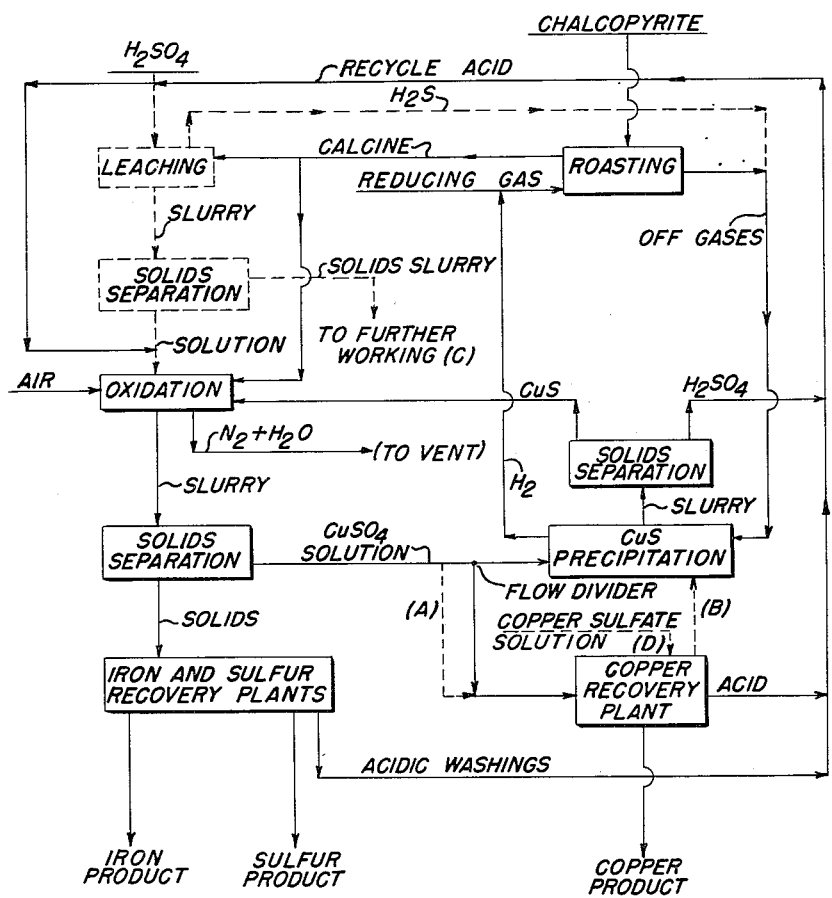
Fig. 2 is a flowscheme wherein the process is applied to the separation of a chalcopyrite ore into constituents.

In Fig. 2, an illustrative chalcopyrite concentrate is subjected to the reduction roast, then the calcine to leaching, solids separation and oxidation in the presence of copper sulfide as in Fig. 1. Insoluble iron compounds and the elemental sulfur are also separated from resultant solution and recovered as in Fig. 1. Again if any precious metals are present, they may be recovered from solids residue after leaching, or if the separation step after leaching is by-passed as optionally shown, in the iron recovery plant, by cyanidation or other known means.

The flow of Figure 2 varies from that of Figure 1 in several respects. Primarily the flow of solution after the oxidation and solids separation steps will be seen to be divided into two streams. One is sent to a copper recovery plant and treated to produce copper metal. This can be done in any of several known ways, as by gas reduction or electrolytic methods. Again, it is the provision of the plant which is important to the flow sheet and the details of the plant operation are not critical parts of the present process. The other flow stream is treated to reform the copper sulfide and the leaching acid. Again this may be done with hydrogen sulfide from the roasting and/or leaching steps. Again the copper sulfide is collected and recycled in the same procedure as in Figure 1. Acid liquor from the copper sulfide separation is recycled, usually directly as shown. Acid from the copper, iron and sulfur recovery plants is also recycled. This may be done directly as shown in Figure 2 or if necessary or desirable by way of an acid concentrating plant as in Figure 1.

Another noticeable distinction is that the use of the leaching and solids separation steps constitute the optional flows rather than the main flows as in Figure 1. This is possible because copper comprises substantially the only non-ferrous metal. The calcine therefore is ordinarily passed directly to the oxidation stage as shown in the main flow line. Any $Cu_2S$ in the calcine will not dissolve in a leaching step such as that of Figure 1, i. e., in acid in the presence of hydrogen sulfide. Therefore the copper in the calcine may be dissolved directly in the oxidation step, the normal leaching and oxidation steps taking place consecutively and concurrently as discussed above. Any necessary precious metal processing is done in the iron and/or sulfur recovery plants.

One important optional flow is indicated by the dotted flow lines A and B. Rather than divide the flow of copper solution from the solid separation step as discussed above, the whole flow may be sent directly to the copper recovery plant as shown at (A). In this procedure copper metal can be drawn out as product from a solution at a higher copper content than in the divided flow method. Product copper is taken down to a residual dissolved copper content which is sufficient to provide for leaching acid and copper sulfide regeneration. At this stage liquor is sent to the copper sulfide precipitation as shown by the optional dotted flow line at (B). When the leaching and subsequent solids separation steps are both by-passed, $H_2S$ and copper sulfide regeneration can be made during roasting.

In a flowscheme such as that of Figure 2, the principal purpose of the leaching and solids separation steps being separably conducted would be to dissolve the iron and separate it with the bulk of the sulfur from the insolubles and the cuprous sulfide. Where the amount of insolubles is relatively large, it may be desirable to use these steps. They are therefore shown as optional. When they are used, because of the high insol content or for some other reason, substantially all the copper will report in the removed solids which can be sent to further working as at (C). The copper can then be redissolved by some suitable method and sent to the copper recovery plant as shown on the dotted flow line at (D). Any precious metals in the solids can also be recovered as part of the "further working."

As discussed in Figure 1, the leaching and solids separation steps were normally used and they could be bypassed successfully as in Figure 2 because copper was the only non-ferrous metal. The flowscheme of Figure 2 is not necessarily preferable when the calcine contains several non-ferrous metals. However, as discussed for both figures, acid is normally provided for leaching and/or oxidation in amounts stoichiometrically deficient to the iron in the calcine. When the leaching and solids separation steps are used, iron is taken up preferentially and substantially only iron is in solution after leaching. Substantially all of the copper and other non-ferrous metals are found in the solids fraction removed before oxidation. In this treatment the amount of acid furnished can be controlled easily so that this removed solids fraction is an excellent concentrate of non-ferrous metals containing any gold, platinum metals and silver and having a low iron content. This procedure provides a flexible method of collecting and separating the non-ferrous metals.

Figure 3:
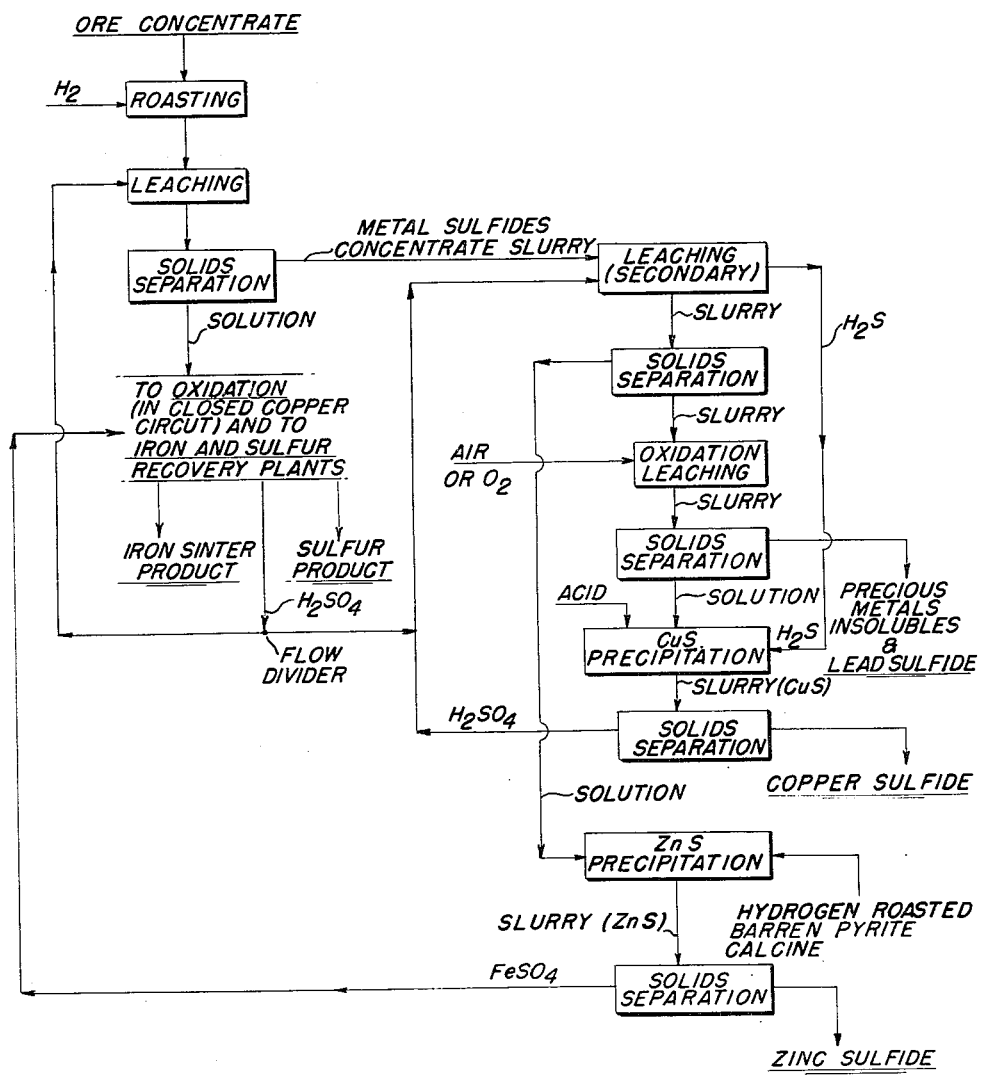
Fig. 3 is a flowscheme wherein the process is applied to a sulfide ore containing iron, copper, lead, zinc, and precious metals.

A further illustrative example of ore treatment, one particularly adapted for feed solids containing a plurality of non-ferrous metals is shown in Figure 3.

For this example a recalcitrant sulfide ore is well represented by an ore from the New Brunswick district which contains values in copper, lead, zinc, iron and sulfur. Various samples assay in the following range:

|    | Percent |
|----|---------|
| Cu | 0.5–1   |
| Pb | 1–2     |
| Zn | 6–8     |
| Fe | ±40     |
| S  | ±40     |
| Acid Insol | 10–15 |

However, of particular interest in Fig. 3 is the treatment of the metal sulfides concentrate slurry from the solids-separation after leaching. They are treated in a secondary leaching step with recycled sulfuric acid. The added acid content of the slurry should be more than that stoichiometrically equivalent to the iron plus the zinc content of concentrate. This step, like the leaching of Figs. 1 and 2, is preferably carried out at about atmospheric pressure and at a temperature of about 25°–100° C. Resultant hydrogen sulfide subsequently is used in non-ferrous metal sulfides separations. After secondary leaching and solids separation, substantially all zinc and iron is in the resultant solution as iron and zinc sulfates. The solution is treated with a hydrogen-roasted, barren-pyrite calcine which preferably contains substantially only iron. This precipitates the zinc as its sulfide and the latter is separated out and recovered. Any remaining iron containing solution is recycled, usually, as shown, to the iron-recovery plant.

Residual solids, after removing the iron-zinc solution, contain the insoluble copper and lead sulfides, together with any precious metals and acid-insoluble gangue. These solids then are subjected to an oxidation leaching. This is done at a temperature of from about 100° to about 350° C., under a total pressure of about 400–1000 p. s. i. g., usually in the range of from about 600 p. s. i. g. maintained with oxygen, oxygen-enriched air or air in amount sufficient to maintain a finite partial over-pressure of oxygen. Preferably but not necessarily the oxygen partial pressure is about 100–200 p. s. i. g. above the autogenous pressure at the operating temperature. Slurry resulting from this oxidation leaching is separated into solution and residue. The residue contains the lead as sulfates, plus the precious metals, plus the acid-insolubles. Depending on the exact temperature in the oxidation step, there may also be a small amount of elemental sulfur here. Usually it will be small in amount and not recovered per se. Any calcium dissolved during leaching will also report at this point as gypsum. Lead and precious metals may be separated from the insolubles and sulfur and gypsum by known means which again in their details are not part of the present invention.

Solution from the oxidation leaching is treated with the hydrogen sulfide off-gas from secondary leaching to precipitate copper sulfide which is collected by any suitable separation method and may be subsequently converted to copper metal by methods the details of which again are not part of the present invention.

It should be noted in this discussion that many mixed sulfide ores falling within the same general category as the illustrative example may also contain nickel and/or cobalt, minerals or even cadmium. If a nickel- or cobalt-containing ore or concentrate is roasted; and if insufficient acid to dissolve all the iron is used, as in the present discussion of Figure 3; substantially all of the nickel and/or cobalt, as sulfides, will report with the sulfides concentrate which is sent as slurry to the secondary ore leaching. They will not dissolve in the latter step to any appreciable extent but will follow the copper into the oxidation leaching, be dissolved therein and pass in solution through the subsequent solids separation.

Precipitation of copper sulfide, usually after adding more acid, is done by means of $H_2S$ from the secondary leaching operation. This is preferably done at about atmospheric pressure or slightly above, and at a temperature above 25° C., but below 100° C. Since the liquor contains free acid, under these conditions substantially no cobalt or nickel precipitates with the copper. Therefore, after copper removal, the solution when treating the illustrative ore will be primarily an acid solution of nickel and/or cobalt sulfates.

As shown in Figure 3, this solution is recycled directly to the secondary leaching. However, as the metal sulfate content builds up in use, this solution may be treated, wholly or partially, by any known methods of recovering nickel and/or cobalt, whether as metal or compounds thereof. If so desired, they may be precipitated as a concentrate of their sulfides in the manner as was the zinc. Again, the details of such methods, other than that some such recovery step is used, form no part of the present invention.

If no cobalt or nickel is present the sulfuric acid solution after the copper sulfide removal is recycled directly to the secondary leaching and oxidation steps as shown in Figure 3. If small amounts of cobalt and nickel are present, the acid solution is usually recycled to leaching until the cobalt and nickel concentration has increased to a level at which their recovery is warranted. Thereafter, before recycling it will be treated, either batchwise as a whole or in part in a separate side stream. If so desired, this may be done by collecting a concentrate of their sulfides as done with the zinc. In such case the exit acid can go to the iron plant. Other known methods of cobalt and/or nickel precipitation can be used without departing from this invention.

Depending on the type of ore originally treated, it may be found that there is a slow but constant build-up of soluble aluminum, magnesium and the like in the circuits that connect the steps of the present invention. If such is the case, these metals may be readily removed by bleeding off a portion of the acid liquor used in either or both primary or secondary leaching steps and replacing it with makeup acid. The latter may be either fresh acid or the objectionable salts may be removed and acid recycled.

A composite sample is treated as shown in Fig. 3. The ore is subjected to the same roasting, leaching and solids-separation steps as in Figs. 1 and 2. However, again a deficiency of sulfuric acid is used. After leaching, resultant solids comprise sulfides of copper, lead and zinc along with precious metals and acid-insoluble gangue solids. Some iron sulfide will be included here since it is not feasible in operation to exactly balance the equivalents of iron and acid, an excess calcined iron is used.

Solution from the solids-separation is again sent to the oxidation step. Copper sulfide is again provided in amount about equivalent to the dissolved iron with this copper following the cycle with copper sulfide operated as described for Fig. 1. This again leads to the production of the elemental sulfur and sintered iron products as in Figures 1 and 2, and for that reason the copper recycle circuit and the sulfur and iron plants are noted only generally in Figure 3.

I claim:

1. In a hydrometallurgical process for separating iron values and sulfur values from materials containing the same, the steps which comprise: roasting an iron-containing sulfide mineral in a non-oxidizing atmosphere; leaching resultant calcine with an aqueous sulfuric acid leaching liquor; treating liquor from said leaching step to the action of oxygen and copper sulfide at an elevated temperature under super atmospheric pressure, whereby the iron and sulfur values are converted to insoluble solids and substantially all the copper is dissolved into solution; separating said insoluble iron values and sulfur values from said solution; treating said solution with a sulfide to produce copper sulfide; collecting so-produced copper sulfide and recycling collected copper sulfide to said liquor treating step.

2. A process according to claim 1 in which said leaching liquor contains sulfuric acid in an amount equivalent to less than about 100% of iron in said roasted mineral.

3. A process according to claim 1 in which said leaching liquor is a spent pickle liquor.

4. A process according to claim 3 characterized by a subsequent acid concentration step to produce sulfuric acid solution of increased concentration.

5. A process according to claim 1 wherein said leaching liquor consists of a portion of said liquor from said oxidizing step.

6. A process according to claim 1 wherein said elevated temperature is above about 100° C. but below about 130° C.

7. In a hydrometallurgical process for separating iron values, sulfur values, and non-ferrous metals values from ores of sulfide minerals containing the same, the steps which comprise: roasting said sulfide minerals in a non-oxidizing atmosphere; leaching resultant calcine with an aqueous sulfuric acid leaching liquor containing an amount of acid equivalent to about 100% of the iron in said calcine; separating the products of said leaching step into a liquor portion and a solid portion; treating said liquor portion to the action of oxygen and copper sulfide at an elevated temperature under superatmospheric pressure whereby substantially all the iron and sulfur values are converted to insoluble solids and copper is dissolved into solution; separating said insoluble iron values and sulfur values from said solution treating said solution with a sulfide to produce copper sulfide; collecting so-produced copper sulfide and recycling collected sulfide to said liquor treating step.

8. A process according to claim 7 in which said roasting operation is carried out in the range of about 500°–800° C.

9. A process according to claim 7 in which said acidic leaching liquid comprises liquid from which said copper sulfide is produced.

10. A process according to claim 7 in which the hydrogen sulfide produced in said leaching step is used as said sulfide to produce copper sulfide.

11. A process according to claim 7 in which a portion only of said liquid portion is treated with a sulfide to produce copper sulfide.

References Cited in the file of this patent

UNITED STATES PATENTS

| | | |
|---|---|---|
| 737,579 | Burschell | Sept. 1, 1903 |
| 1,567,378 | Millar | Dec. 29, 1925 |
| 1,672,924 | Bacon | June 12, 1928 |
| 1,751,068 | Benner | Mar. 18, 1930 |
| 1,769,819 | Bacon | July 1, 1930 |
| 1,917,227 | Bacon et al. | July 11, 1933 |
| 1,917,232 | Bacon et al. | July 11, 1933 |
| 2,270,174 | Stoeckly | Jan. 13, 1942 |
| 2,619,407 | Udy | Nov. 25, 1952 |